(No Model.)
I. J. EDGE.
FLY TRAP.
No. 499,722. Patented June 20, 1893.
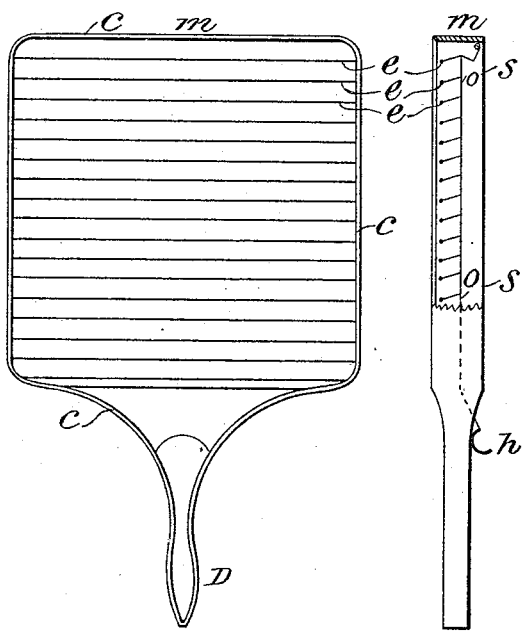
Witnesses
J M Falconer
G E White
Inventor:
Isaiah Joseph Edge

UNITED STATES PATENT OFFICE.

ISAIAH J. EDGE, OF MINNEAPOLIS, MINNESOTA.

FLY-TRAP.

SPECIFICATION forming part of Letters Patent No. 499,722, dated June 20, 1893.

Application filed July 19, 1892. Serial No. 440,549. (No model.)

*To all whom it may concern:*

Be it known that I, ISAIAH JOSEPH EDGE, a citizen of the United States, and a resident of Minneapolis, in the county of Hennepin, in the State of Minnesota, have invented a certain new and Improved Fly-Trap, of which the following is a specification, which will be more clearly understood by having reference to the accompanying drawings, in which—

Figure 1 is a front view of the implement, showing the air valves closed, and Fig. 2 is a sectional side view of the same, showing air valves open.

My invention relates to the class of fly traps which are operated by being swept forward through the air, but it differs materially from all others; for the reason that it is never used in combination with bait or allurement of any kind to attract flies, nor poison of any kind, nor "sticky" paste, or any glutinous substance whatever; its action and mode of operation being purely mechanical.

The object I have in view, is to provide an effective fly trap, which shall be cheap and simple and easy to operate, and shall also be neat and cleanly, safe and durable. I attain this object by the means herein shown and described, in which Fig. 1 is a hoop or frame, having a handle D, and surrounding a chamber which is covered on the back with a clean screen which may be of any suitable substance similar to wire cloth and is also covered on the opposite side or front with a series of valves which open inward, to right angles, or nearly so, with the front, so as to offer but slight resistance to the air as the implement is being swept forward through it. These valves are hinged, like doors, to the rods or cords, e e e, Figs. 1 and 2, which are fastened across the front of the frame. The valves are kept closed by means of one or more delicate springs at m, Figs. 1 and 2, which are of rubber, metal or other suitable substance, and are attached to the rods or cords o o, Fig. 2, which cords are also attached to and connect the inner or free edge of each valve as shown in Fig. 2, so that these valves when shut will effectually close the chamber by fitting closely or by overlapping or "shingling" on each other, so as to retain the flies in the chamber securely. But the valves are all opened at once by drawing the sliding or pivoted trigger or hook h, Fig. 2, which is connected with the cords o o as shown. For the purpose of taking flies off a table or counter or other smooth surface, the implement is made long and narrow, having one or more valves running lengthwise.

To operate the implement, it is grasped by the handle and brought forward through the air with a rapid sweeping motion. By this means, the resistance of the air opens the valves, the air rushing into the chamber and out through the screen S S, Fig. 2, which arrests the flies. The valves are closed automatically by the spring at m, Figs. 1 and 2, when the motion ceases.

Having thus fully and clearly described my invention, what I do claim, and desire to secure by Letters Patent, is—

1. An implement or trap, consisting of a frame of suitable form, having a handle or other means of operation, which frame partially incloses a chamber the internal space of which is completely inclosed, by being covered by a clean screen on one side, and covered on the opposite side by one or more valves, which when shut will completely and effectually close the chamber.

2. A fly trap or implement having a chamber for the reception and retention of flies, the said chamber having a clean screen of wire cloth or other similar material on one side, and having on the other side opposite, one or more hinged valves which open inward by the resistance of the air, to admit flies, and close automatically, by spring power.

3. The combination of a fly trap or implement, consisting of a chamber, formed by a frame having a screen and one or more valves, and also a handle or other suitable means of operation; said implement to be made and operated substantially in the manner shown and described in the foregoing drawings and specification.

ISAIAH J. EDGE.

Witnesses:
F. C. MILLIMAN,
G. E. WHITE.